No. 681,044. Patented Aug. 20, 1901.
F. E. DEULIN.
FRYING PAN.
(Application filed May 31, 1901.)
(No Model.)
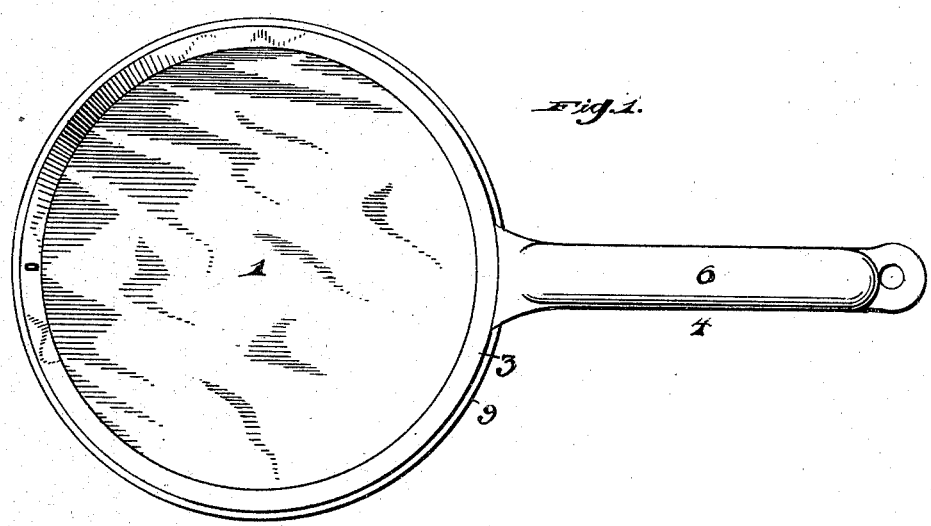
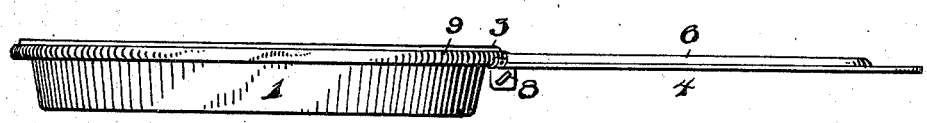
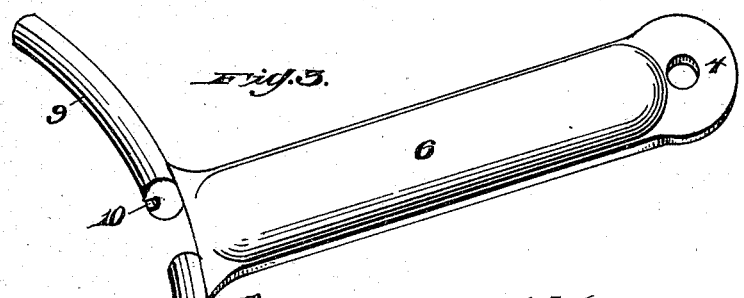
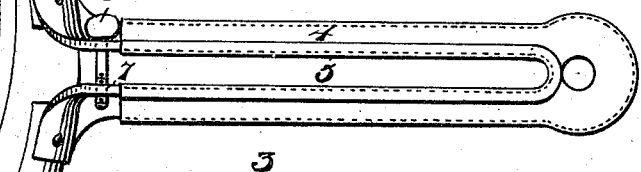
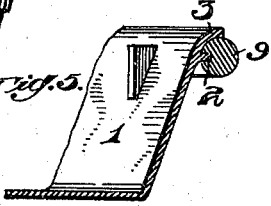
Witnesses: Inventor
F. E. Deulin.

UNITED STATES PATENT OFFICE.

FERNAND E. DEULIN, OF JEANNETTE, PENNSYLVANIA.

FRYING-PAN.

SPECIFICATION forming part of Letters Patent No. 681,044, dated August 20, 1901.

Application filed May 31, 1901. Serial No. 62,657. (No model.)

*To all whom it may concern:*

Be it known that I, FERNAND E. DEULIN, a citizen of the United States of America, residing at Jeannette, in the county of Westmoreland and State of Pennsylvania, have invented certain new and useful Improvements in Frying-Pans, of which the following is a specification, reference being had therein to the accompanying drawings.

This invention relates to certain new and useful improvements in removable handles for cooking utensils, and relates more particularly to handle attachments for frying-pans, skillets, and the like.

The invention has for its object to provide a handle that may be easily removed from the utensil and applied to another form or other skillet or frying-pan, as the case may be.

The invention still further contemplates to construct a handle that will be extremely simple, strong, durable, and comparatively inexpensive to manufacture.

The invention consists of a handle carrying an arm having formed therein a circumferential groove which is adapted to engage the annular flange formed integral with and extending outwardly from the pan, skillet, or like utensil.

The invention further consists in novel means that will allow the handle to be easily tightened to grasp or retain a firm hold upon the cooking utensil, and, furthermore, to provide novel means that will allow the handle to be easily loosened and removed from the cooking utensil when desired.

With the above and other objects in view the invention finally consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a top plan view of my improved handle attached to a pan or skillet. Fig. 2 is a side elevation thereof. Fig. 3 is a perspective view of the handle having the rim portion partly broken away. Fig. 4 is an underneath plan view of the handle, showing a portion of the rim broken away. Fig. 5 is a detail sectional view of a portion of the pan, showing more clearly the connection between the pan and the rim of the handle.

In the drawings the reference-numeral 1 indicates the pan, having an annular outwardly-extending flange 2, formed integral therewith. Said pan also is formed with an upper curved portion, as shown at 3.

The reference-numeral 4 indicates the handle, formed of a U-shaped extension 5, having arranged over said U-shaped extension a tin or other suitable cover 6. At the extension of the U-shaped portion screw-threaded apertures 7 are provided to receive the adjusting-screw 8, which either tightens or loosens the handle, as desired.

The reference-numeral 9 represents an annular rim, having formed therein a groove 10, said groove being adapted to receive the flange 2 of the pan.

The operation of my improved device is as follows: When it is desired to attach the handle to a vessel, the adjusting-screw 7 is loosened, thereby allowing the U-shaped extension to slightly expand, which will permit the rim portion 9 to be easily applied in position in proper relation with the pan, thereby engaging the flange. When this has been done, the adjusting-screw 7 is tightened, thereby contracting the U-shaped portion, which will in turn serve to tighten and firmly clamp the rim 9 upon the flange 2.

The many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

1. In a device of the character described, the combination of a pan, an exterior outwardly-extending flange secured thereto, a segmental portion carried by the upper edge of said pan, a rim adapted to be seated against said segmental portion and having a groove therein to receive said flange, a U-shaped handle secured to said rim, and an adjusting-screw secured to the forward ends of said handle, substantially as described.

2. In a device of the character described, the combination of a pan, a flange secured to the periphery near the upper edge of said pan, a segmental portion made integral with the upper edge of said pan, a rim adapted to be seated against said segmental portion and having a groove therein to receive said flange, a U-shaped handle connected to said rim, and means connected near the ends of said handle for adjusting the rim and handle, substantially as described.

In testimony whereof I affix my signature in the presence of two witnesses.

FERNAND E. DEULIN.

Witnesses:
 JOHN NOLAND,
 E. E. POTTER.